INVENTOR.
VICTOR F. CARTWRIGHT

Fig. 2.

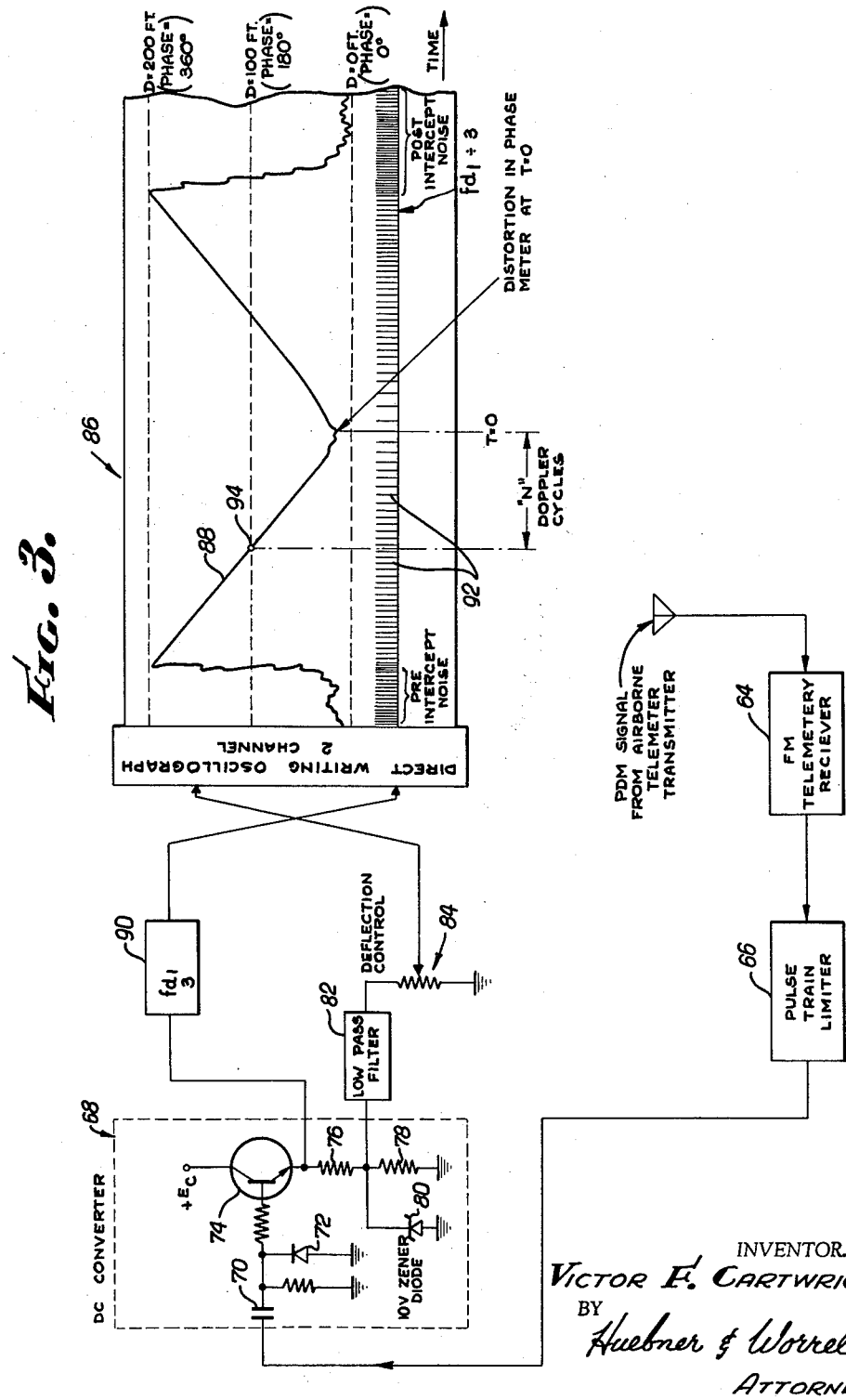

United States Patent Office 3,168,735
Patented Feb. 2, 1965

3,168,735
DOUBLE SIDEBAND-SUPPRESSED CARRIER DOPPLER DISTANCE MEASURING SYSTEM
Victor F. Cartwright, Fullerton, Calif., assignor to Traid Corporation, Encino, Calif., a corporation of California
Filed Sept. 19, 1962, Ser. No. 224,658
19 Claims. (Cl. 343—12)

The present invention relates to electronic systems for measuring the distance between two relatively moving objects in space, and it relates particularly to such a system having special utility in determining the closest distance which a missile approaches an airborne target, or miss-distance.

It is desirable in systems of this general type to employ a "passive" system; i.e., a system wherein all equipment is on the target and none of the equipment is on the missile. This is true for several reasons. First, since each missile is expendable, any part of a distance measuring system installed on the missile becomes a direct expense with each round fired. Such is not the case for equipment installed on the target, as the target is usually retrievable, so that the equipment can be used again. Also, it is feasible where all equipment is mounted on the target to establish an air-to-ground radio link which can serve to predict the equipment condition at any time, and this would not be practical with equipment installed on the missile because such equipment must be very small, which greatly restricts in-flight monitoring methods to determine proper functioning at the time of intercept.

In order for a miss-distance system to be useful, the maximum operating range must be on the order of about two hundred feet between the target and missile, and any distance between about five feet and two hundred feet must be determined with an accuracy of plus or minus ten percent of the absolute distance. This means, for example, that a miss of twenty feet must be recorded with an accuracy of plus or minus two feet. In a system where cooperating equipment is installed on the missile with no way of determining its accuracy, the possibility of obtaining an overall system accuracy on this order is remote.

A "passive" distance measuring system must operate by radiating an electromagnetic signal from the target and receiving an echo of the radiated signal which is on or close to the radiated frequency. At distances of five to ten feet it is impractical to determine the time lapse between the two events, and it is accordingly necessary to transmit and receive on substantially the same frequency simultaneously.

Two basic prior art passive methods have been used for obtaining miss-distance information, (1) wide band frequency modulation, and (2) Doppler, both C.W. and pulsed. In the frequency modulation method, an RF frequency was swept from $f_1$ to $f_2$ at some periodic rate. During the sweeping period the echo received at any instant has a frequency different from the signal being transmitted due to the time lag of the returning echo. The echo, when heterodyned with the transmitted signal, thus produces a beat or difference frequency which can be calibrated to indicate range. The difficulty with this frequency modulation method is that the frequency must be swept over a very wide range in order to obtain a frequency difference great enough to measure in the short time available. This means that the receiver must have a very wide bandwidth, and the receiver consequently becomes insensitive to weak echos. Also, the received signal in such an FM system contains a Doppler frequency which cannot easily be separated from the true frequency. Where the relative velocity at intercept is high, this Doppler frequency shift creates a beat frequency error much greater than the required plus or minus ten percent of the true range.

A classical prior art passive Doppler system comprises a C.W. transmitter and a receiver both located on the target. The radiated signal $f$ and the echo shifted in phase $\phi$ appear at the receiver input, the amount of phase shift $\phi$ depending on the distance D to the echoing surface. The phase of the reflected signal relative to the phase of the transmitted signal can be shown in radians to be:

(1) $$\varphi = \frac{4\pi D}{C} f \text{ or } \frac{4\pi D}{\lambda}$$

where C is the velocity of light, and $\lambda$ is the wave length of the radiated signal $f$.

In actual operation, this phase component $\phi$ varies with time due to the relative motion of the target, and the instantaneous frequency $f_d$ (Doppler frequency) of this phase variation is:

(2) $$f_d = \frac{1}{2\pi} \cdot \frac{d\phi}{dt}$$
$$= 2\frac{dD}{dt} \cdot \frac{1}{C} \cdot f$$

or, since $$\frac{dD}{dt}$$

represents closing velocity $v$ at intercept, (3) $$f_d = 2\frac{v}{C} \cdot f$$

Accordingly, it can be seen that the distance information at intercept is contained in the rate-of-change of the Doppler frequnecy $f_d$. Thus, in order to extract range in such a single Doppler system, it is necessary to measure frequency as a function of time and to calibrate the frequency-time slope. This is usually accomplished by a curve matching technique wherein the slope of the curve is matched to cards having various curves thereon, and a computer is normally required to extract the correct card. Such curve matching is difficult to accomplish with the required accuracy, and usually requires an amount of time which cannot be tolerated. Further, any frequency modulation or phase jitter on the transmitted signal will appear in the receiver output as noise, leading to further inaccuracy.

The prior art pulsed Doppler system produces a Doppler frequency $f_d$ in exactly the same manner as the C.W. Doppler method, the difference being that the carrier frequency $f_t$ is allowed to radiate periodically for only a very brief interval of time. Data reduction on the pulsed Dopper system is relatively simple, requiring only that the Doppler events be counted and subtracted from a known constant. However, the pulsed Doppler method for measuring miss-distance has three distinct disadvantages. First, the pulse required is very narrow and must have very rapid rise and decay times, and since this pulse must be passed in system, the bandwidth must be great, causing a reduction in receiver sensitivity and resulting limitations on the maximum range of the system. Second, at distances which correspond to a time lag greater than the pulse interval, the transmitter is inactive at the time the reflected signal returns to the receiver, so that no phase or frequency reference is available and therefore the receiver output is zero. Accordingly, if a missile passes outside this maximum operating range, determined by pulse width, no output is obtained and therefore it is impossible to determine whether the lack of signal was due to excessive range or to malfunctioning of the equipment. Third, the power spectrum radiated by the pulsed Doppler transmitter is very broad and therefore is a source of interference for other nearby equipment. Also, the wide band receiver that is required is prone to outside interference.

Briefly, the present invention is a C.W. Doppler system wherein two signals are transmitted at a fixed frequency separation. In this case, the phase difference between the two resulting Doppler signals is a direct function of distance and therefore the miss-distance can be extracted by phase sensitive circuit means without having to calibrate a frequency-time slope as with the single C.W. Doppler system.

It has heretofore been impractical to obtain the required 10% accuracy in such a dual Doppler system, for several reasons. The frequency separation between the two transmitted signals is quite small, and any phase jitter on either of the two transmitted signals produces an equivalent noise output from the system. For this system to function properly, a short-time frequency stability is required which heretofore could not readily be obtained. Furthermore, it is also necessary to have extraordinarily precise long-time frequency stability if narrow bandwidth receivers are to be employed, and such narrow bandwidth receivers are vitally important in a system of this type in order to be able to attain sufficient gain so that incidental AM noise can be minimized.

In this type of system, an isotropic or omnidirectional antenna is necessary, as the relative paths of the target and missile cannot be forecast, and this, coupled with the fact that the missile presents only a relatively small reflecting cross-section, requires either a large amount of transmitted power or a highly sensitive receiver. In order to keep the equipment compact and light in weight, the sensitive receiver is preferable. However, this makes the system highly sensitive to both AM and FM noise. Microphonics producing such AM and FM noise are a particularly serious problem in this type of equipment because of the tremendous amount of vibration which is caused when the shock wave from a supersonic missile hits the target, which occurs right at the time when optimum accuracy is required. Such microphonics occur in the antenna, in the transmitter oscillator, and in various other parts of the system, and this is actually the primary reason why it has been practically impossible to produce the desired accuracy in systems of this general type in the past.

In the dual Doppler system of the present invention phase shifting between the two Doppler signals and such interference by microphonics have been greatly reduced to a level which readily permits the desired over-all 10% accuracy for the system, by a novel correlation of all of the frequencies employed in the system which provides inherent cancellation of incidental FM, and which provides a long-time frequency stability which permits narrow bandwidth receivers and consequently the required high gain for elimination of incidental AM. This frequency correlation is achieved by employing a double-sideband, suppressed carrier system that maintains coherence between the two radiated signals and furnishes a coherent local oscillator pair for the receiver.

An important part of the present invention is novel means for detecting the phase difference between the two Doppler signals which is simple and very compact, and which greatly simplifies telemetry transmission to a ground recording station. This means for detecting the phase difference comprises a bi-stable multivibrator which is "set" at the commencement of each cycle of the higher Doppler frequency and is "reset" at the commencement of each cycle of the lower Doppler frequency, whereby the output of the bi-stable multivibrator is a pulse wave train which varies in duration with each Doppler cycle. This pulse train modulates a telemetry transmitter and is transmitted to the ground recording station, at which it is readily reproduced and upon integration the D.C. voltage therefrom is directly proportional to range, whereby a galvanometer in a recording oscillograph will have a deflection which can be calibrated directly in range. The individual Doppler cycles each correspond to $\lambda/2$ for the transmitted signal which is reflected off of the missile; i.e., correspond to a discrete distance in space. The discrete Doppler cycles or events are recorded simultaneously at the ground recording station on a separate galvanometer. Since the Doppler frequency drops to zero at the point of closest approach, the phase difference between the two Doppler signals as detected and indicated by the deflection galvanometer will be distorted at this point, giving rise to error. However, at other points the D.C. deflection is accurate, so that a precise determination of distance can be obtained by choosing a known distance on the D.C. deflection record and counting the number of Doppler cycles from this point to the point of closest approach, and then substracting the distance indicated by this number of Doppler cycles from the known distance chosen.

In the present dual Doppler system the maximum range which can be measured corresponds to the distance at which the first ambiguity between the Doppler frequencies will occur, i.e., at which the phase difference between the two Doppler signals is 360°. A practical maximum distance for the first ambiguity is about 200 feet, and with this range, a sufficiently wide frequency separation between the two transmitted signals is permitted to provide an accurate system.

Details of a presently preferred embodiment of the invention are set forth in the following description taken in conjunction with the accompanying drawings.

In the drawings:

FIGURE 2 is a diagrammatic view illustrating the amplified and limited Doppler frequency wave forms which are fed to the bi-stable multivibrator operating as a phase sensing means, and also illustrating the output wave form of the multivibrator and the integrated D.C. voltage resulting therefrom which is proportional to miss-distance.

FIGURE 3 is a diagrammatic view of the ground recording station.

Figure 1:
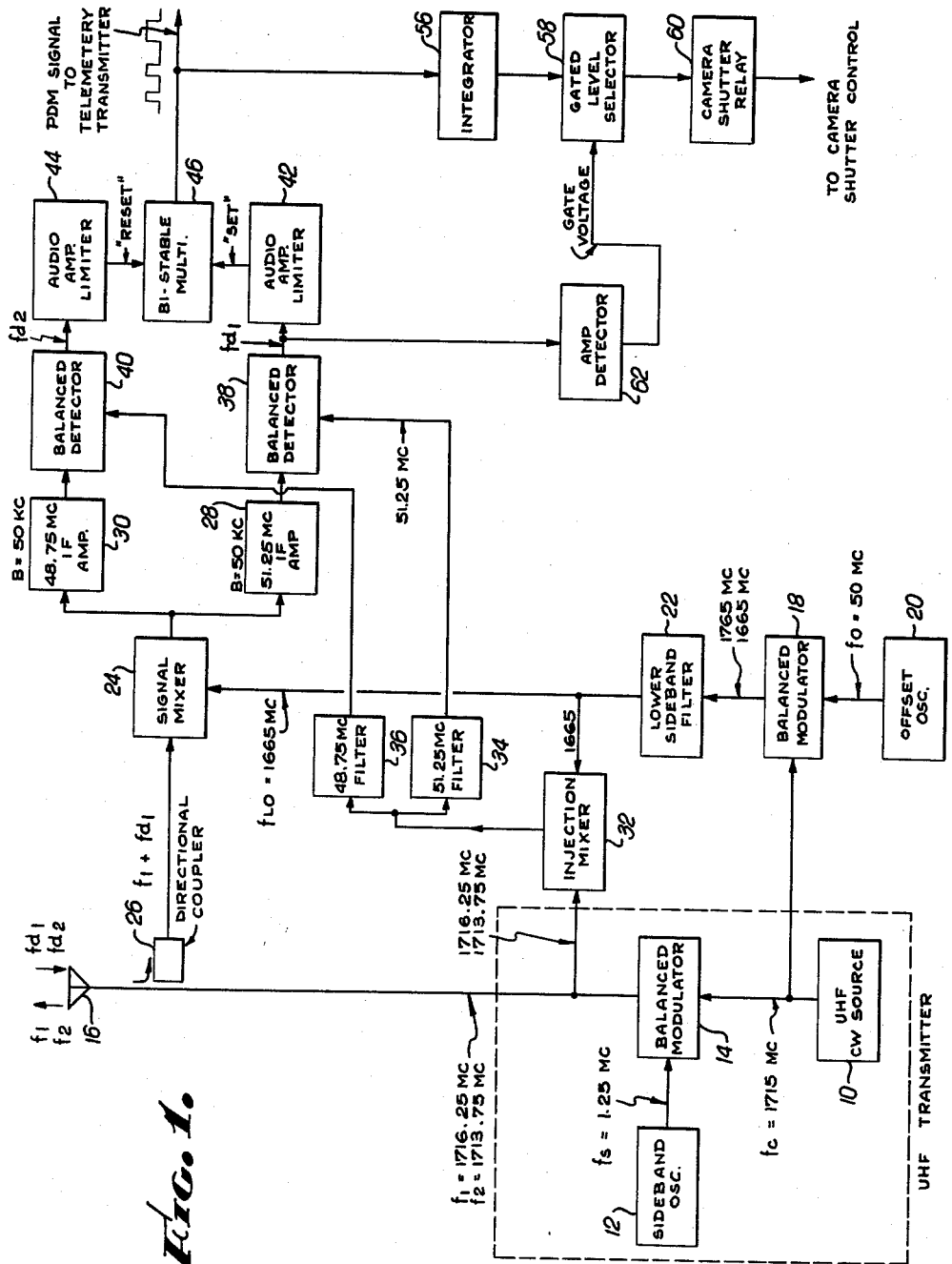
FIGURE 1 is a block diagram of the airborne station of the present invention which is disposed on the target.

Referring to the drawings, and at first particularly to FIGURE 1 thereof, the airborne station includes a transmitter having a UHF carrier wave source 10 with a nominal frequency output $f_c$ of 1715 mc., which is chosen to be in the IRIG-recommended band for this purpose. At this high frequency, it is far more economical to employ a vacuum tube cavity-type oscillator, rather than utilizing a crystal controlled oscillator. Such a cavity oscillator may only be accurate to within about ±.1% due to microphonics variations, but because of the coherence between the carrier wave signal $f_c$ and the various other signals involved in the system, any variations in $f_c$ merely become a second order effect in the system, producing less than ±.005% error.

A sideband oscillator 12 produces another signal $f_s$ at 1.25 mc., and $f_c$ and $f_s$ are both fed into a first balanced modulator 14, wherein the signal $f_c$ is modulated with $f_s$ so as to produce two symmetrical sidebands $f_1$ and $f_2$ at 1716.25 mc. and 1713.75 mc., respectively. The carrier $f_c$ is balanced to ground and is suppressed, leaving only the two sidebands $f_1$ and $f_2$. The sideband oscillator 12 is preferably a simple crystal oscillator, controllable to about ±.005%, which would introduce an insignificant amount of error in determining a range up to 200 feet.

At a transmitting frequency of 1715 mc., the wavelength is about $\lambda=8$ inches, and since one Doppler cycle corresponds to $\lambda/2$, each Doppler cycle corresponds to 4 inches of travel in space, or ⅓ of a foot. The Doppler event frequency is divided by 3 in the ground recording station so that each recorded Doppler event will correspond to one foot of travel in space, as will be set forth in detail hereinafter in connection with the description of the ground recording station illustrated in FIGURE 3. It is thus seen that the specific frequency of $f_c$ is chosen within the IRIG recommended band so that the individual Doppler events can be counted to determine convenient units of measurement in space.

Although for purposes of simplicity in the present description, the sideband oscillator frequency $f_s$ is given as 1.25 mc., the actual modulation frequency is 1.2295 mc., so that the sidebands $f_1$ and $f_2$ are separated by 2.459 mc., this actual modulation frequency being based upon the speed of light C being equal to 983.561 feet/usec., to give 200 feet unambiguous range measurement.

Accordingly, regardless of variations which might occur in $f_c$, the frequency separation between the two sidebands $f_1$ and $f_2$ will be stable according to the stability of sideband oscillator 12. The signals $f_1$ and $f_2$ are transmitted from antenna 16, and the reflected signals which are received by the antenna 16 will have the respective Doppler frequency components $f_{d1}$ and $f_{d2}$.

Assume the reflecting object to start ($t=0$) moving away at a constant velocity from zero distance. Under this condition, the instantaneous phases of the received signals are equal and zero, and the phase difference between $f_{d1}$ and $f_{d2}$ is also zero. As the reflecting object progresses away, according to Formula 3 above, the respective Doppler frequency components will be:

$$(4) \quad f_{d1}=2\frac{v}{C}f_1$$

$$(5) \quad f_{d2}=2\frac{v}{C}f_2$$

The frequency difference between $f_{d1}$ and $f_{d2}$ will be:

$$(6) \quad \Delta f_d=2\frac{v}{C}(f_1-f_2)$$

The distance from D equals zero where one complete $\Delta f_d$ cycle is completed is dependent only on the frequency separation of $f_1$ and $f_2$, and this can be determined by considering that the first ambiguity will occur at:

$$(7) \quad \frac{4\pi D_{max}}{C}\times\frac{\Delta f_d}{2}=\frac{\pi}{2}$$

and $$(8) \quad f_d=\frac{C}{4\pi D_{max}}$$

It will be apparent that the phase difference between $f_{d1}$ and $f_{d2}$ will be linearly proportional to distance up to the first ambiguity at $D_{max}$, which has been selected as 200 feet in the present instance. The apparatus for detecting this phase difference and indicating it as distance, while at the same time eliminating the effects of frequency shift and AM and FM noise, will now be described.

The frequency $f_c$ from carrier wave source 10 is mixed in a second balanced modulator 18 with a stable frequency $f_o$ from an offset oscillator 20 to produce two sidebands separated by $2f_o$. In this instance, $f_o$ is selected as 50 mc., and because of this relatively low frequency, it is practical for the offset oscillator 20 to be a transistor oscillator, if desired, having resonating coils which are physically stable. The offset oscillator 20 can readily be controlled to about ±.005%, which will not introduce any appreciable error into the system. Thus, the output from balanced modulator 18 comprises an upper sideband at 1765 mc. and a lower sideband 1665 mc. This lower sideband $f_{Lo}$ of 1665 mc. is extracted in lower sideband filter 22, and $f_{Lo}$ is employed as a local oscillator signal, being fed to a signal mixer 24.

Also fed to the signal mixer 24 is the reflected signal from the antenna comprising $f_{d1}$ and $f_{d2}$, as well as the transmitted signal including $f_1$ and $f_2$ in attenuated form. A convenient means for attenuating the transmitted signal comprising $f_1$ and $f_2$ for application to the signal mixer 24 is the use of a directional coupler 26 which will only attenuate the reflected signal about .5 db, while attenuating the transmitted signal about 30 db. If desired, a separate antenna having 30 db attenuation could be employed for picking up the transmitted signal, in place of the directional coupler. Thus, in the signal mixer 24, the local oscillator signal $f_{Lo}$ of 1665 mc. is mixed with the signals $f_1$ plus $f_{d1}$ and $f_2$ plus $f_{d2}$.

It is important to note at this point that the signals $f_1$ and $f_2$ and $f_{Lo}$ at the signal mixer 24 are coherent in the sense that any frequency or phase drift in $f_1$ and $f_2$ is followed exactly by $f_{Lo}$, since $f_{Lo}$ was produced as a sideband by modulation of $f_c$ with the stable frequency $f_o$.

In the signal mixer 24 the two inputs $f_1$ plus $f_{d1}$ and $f_2$ plus $f_{d2}$ are heterodyned with $f_{Lo}$ to give two IF frequencies at 51.25 mc. and 48.75 mc. which are fed to IF amplifiers 28 and 30, respectively. The bandwidth of these IF amplifiers 28 and 30 can be very narrow since the drift of signal is controlled by $f_o$ which is produced by the stable offset oscillator 20; for example, the bandwidth can be on the order of 50 kc. At this point in the system, because of the aforesaid coherence between the signals $f_1$, $f_2$ and $f_{Lo}$ at the signal mixer 24, FM noise and phase drift have been effectively canceled out.

Because of the narrow bandwidth of the IF amplifiers 28 and 30, the receivers can be highly sensitive. It is to be noted that even if the UHF carrier wave source 10 were crystal controlled, without the coherent signals of the present invention, such narrow bandwidths could not be obtained, and hence such high sensitivity could not be obtained in the receivers.

The next step is to detect the Doppler frequency components of $f_{d1}$ and $f_{d2}$, and this is accomplished by developing two additional coherent reference signals of 51.25 mc. and 48.75 mc. which are beat with the respective outputs of IF amplifiers 28 and 30 to produce the two Doppler frequencies $f_{d1}$ and $f_{d2}$. These two reference frequencies of 51.25 mc. and 48.75 mc. are provided by introducing the output $f_{Lo}$ of 1665 mc. from lower sideband filter 22 and also the output frequencies of 1716.25 mc. and 1713.75 mc. from first balanced modulator 14 into an injection mixer 32. The output signals of 51.25 mc. and 48.75 mc. from injection mixer 32 are separated by filters 34 and 36, and the reference signal of 51.25 mc. is fed to a balanced detector 38 together with the output signal from IF amplifier 28, while the reference signal of 48.75 mc. is fed through a balanced detector 40 together with the output of IF amplifier 30. Accordingly, the outputs from balanced detectors 38 and 40 will be audio frequency Doppler signals $f_{d1}$ and $f_{d2}$, respectively.

Because of the high gain of the IF amplifiers 28 and 30, the signals therein can be limited so as to effectively eliminate AM noise. Accordingly, the Doppler signals $f_{d1}$ and $f_{d2}$ from balanced detectors 38 and 40, respectively, are substantially free of both incidental FM and incidental AM.

The doppler signals $f_{d1}$ and $f_{d2}$ from balanced detectors 38 and 40 are presumably in sine wave form, and they are fed to respective audio amplifier-limiters 42 and 44 wherein they are amplified and limited to a constant amplitude, resulting in a square wave audio frequency output for each of the audio amplifier-limiters 42 and 44.

The audio amplifier-limiters 42 and 44 are connected to a bistable multivibrator 46 so that the leading edge of each $f_{d1}$ Doppler cycle triggers one side of multivibrator 46 "on" or "set" and the leading edge of each $f_{d2}$ Doppler cycle triggers the multivibrator 46 "off" or "reset."

Figure 2:
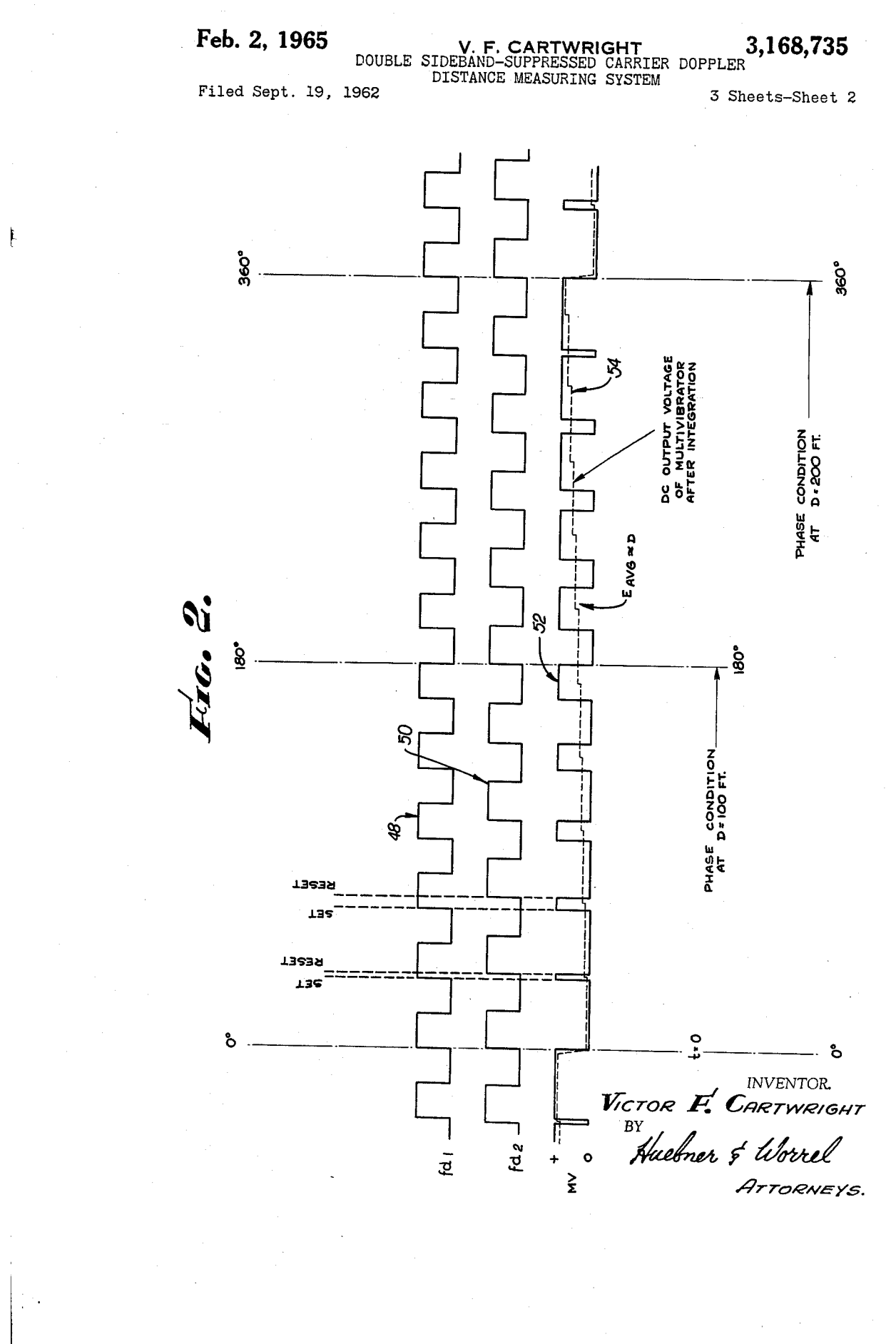

The wave forms of $f_{d1}$ and $f_{d2}$ at the outputs of audio amplifier-limiters 42 and 44, respectively, are illustrated in FIGURE 2 of the drawings, $f_{d1}$ being designated by the reference numeral 48 and $f_{d2}$ by the numeral 50. In the interest of simplicity, the wave forms 48 and 50 are drawn graphically as constant frequencies. At miss-distance other than exact zero, both frequencies will change with time, although the phase relationship between them is still linearly proportional to distance. Accordingly, the manner in which the wave forms 48 and 50 are shown in FIGURE 2 accurately illustrates the phase relationship between them. It will be seen that at a distance of zero, the wave forms 48 and 50 are in phase, and as the distance increases from zero up to 100 feet, the phase relationship shifts proportionally to 180°. From 100 feet to 200 feet the phase further shifts from 180° to 360°, which is the point of first ambiguity.

The third wave form 52 illustrated in FIGURE 2 is the output wave form from the bi-stable multivibrator 46. It will be noted that the amount of "on" time of the multivibrator 46 will increase in proportion to the miss-distance from a miss-distance of zero up to the first ambiguity at 200 ft. Accordingly, the "on" time of the multivibrator 46 will be zero at a miss-distance of zero, will be one-half of the multivibrator's cycle at 100 feet, and will be the full multivibrator's cycle at 200 feet. Thus, if the voltage output of the multivibrator is integrated, as indicated by the curve 54 in FIGURE 2, it will be found to be directly proportional to the miss-distance, and such an integrated voltage output is developed in the ground recording station for directly recording distance on a recording oscillograph as described in detail hereinafter and as illustrated in FIGURE 3 of the drawings.

Returning to FIGURE 1, optional equipment is there illustrated in block diagram for actuating an airborne camera shutter so as to photograph the passing missile to show relative position and attitude of the missile at some time just prior to intercept. This equipment includes an integrator 56 which is fed by the output of multi-vibrator 46 and which produces D.C. voltage $E_{avg}$, corresponding to the curve 54 in FIGURE 2. A predetermined $E_{avg}$ voltage level is selected by a gated level selector 58 and closes a relay 60 which operates the airborne camera shutter. The level selector 58 is gated to its open position by an amplitude detector 62 which senses the presence of a signal from one of the balanced detectors 38 and 40. This control of the gated level selector 58 by a single Doppler signal provides a safety factor so that if noise should happen to energize the integrator 56, the gate at 58 would only operate if this noise were of an amplitude comparable to the signal level. This prevents erroneous operation of the camera under ordinary noise conditions. In this way, camera film is conserved and the film developing process is greatly simplified. If a stepping shutter is used, several photos can be obtained on one film frame. Successive frames can be advanced automatically.

The output of the bi-stable multivibrator 46 is fed to a telemetry transmitter which transmits a PDM (pulse duration modulation) signal.

Referring now to the ground recording station shown in FIGURE 3, this PDM signal is received in the ground telemetry receiver 64 which reconstructs the multivibrator output wave form designated 52 in FIGURE 2 to its original form. This is limited in pulse train limiter 66 to reduce noise, and is fed into a D.C. converter 68, which establishes a zero reference to the wave form and decreases impedance in the manner hereinafter described in detail.

The pulse train is fed through a capacitor 70 and is restored positive by a diode 72, and is then fed to the base of an NPN transistor which is cut off until a positive going wave form drives it into conduction, at which time its emitter voltage rises abruptly positive to a voltage depending upon the collector voltage $E_c$, for example, 20 volts. The emitter is connected to ground through a series arrangement of resistors 76 and 78 and a Zener diode 80 is connected between ground and the junction between resistors 76 and 78. The Zener diode 80 has a fixed breakdown voltage, for example, 10 volts, so that when the emitter of transistor 74 rises to 20 volts as the transistor is driven into conduction by a positive going wave form, the Zener diode will break down at plus 10 volts, and the other 10 volts will be dropped across resistor 76. Accordingly, the voltage across resistor 78 will go from exactly 0 to exactly plus 10 volts regardless of variations in the peak voltage of the input wave form and regardless of variations in the collector voltage of the transistor.

This clamped wave form is fed into a low-pass filter 82 having a bandwidth adequate to pass rate-of-change of distance but not the high frequency wave form components. For example, the low-pass filter 82 may have a cutoff of about 40 c.p.s. and accordingly the filter 82 will function as an integrator. This integrated D.C. voltage is fed to a deflection control potentiometer 84 and thence to one galvanometer of a recording oscillograph 86, the deflection of this galvanometer being calibrated directly in range so as to produce the range record curve 88 as shown in FIGURE 3.

The emitter of transistor 74 is connected through a frequency divider 90 to a second galvanometer of the recording oscillograph 86. The frequency divider 90 divides the frequency of the Doppler events by 3. As stated hereinabove, at 1715 mc. the wave length is about $\lambda = 8$ inches so that one Doppler cycle corresponds to $\lambda/2$ or 4 inches of travel in space. By dividing the Doppler events by 3 in the frequency divider 90, an output event is provided which occurs once for every foot of travel in space, or $1.5\lambda$. The output of the frequency divider 90 is in the form of short pips, and since each pip corresponds to one foot of travel in space, the Doppler event record 92 produced on the recording oscillograph 86 by the second galvanometer in accordance with these pips will constitute a record of every foot of travel in space between the missile and the target.

The Doppler frequency drops to 0 at the point of closest approach between the missile and the target, and accordingly the range record curve 88 will be subject to distortion at this point, as it corresponds to phase difference between the two Doppler signals $f_{d1}$ and $f_{d2}$, and this will give rise to error at the point of closest approach. However, at other points the D.C. deflection recorded in the range record curve 88 is accurate, so that if a precise determination of the miss-distance is desired, a known distance on the range record curve 88 can be chosen, as for example, the point 94 which is the 100-foot point on the range record curve 88, and a line drawn directly down to the Doppler event record 92. The number N of pips on the Doppler event record 92 between this point and the point of closest approach $T=0$ can be counted, and by subtracting this number N from the known distance chosen corresponding to the point 94, an accurate determination of the closest distance of approach, or the miss-distance, can be determined. For example, if the point 94 on curve 88 corresponds to 100 feet of distance between the missile and the target, and 40 pips are counted on the Doppler event record 92 between this point and the point $T=0$, the miss-distance will be 100−40 or 60 feet.

Accordingly, the miss-distance can be determined almost instantaneously as it occurs by a direct reading of the range record curve 88, and if it is desired to determine the miss-distance with the best accuracy, by counting the pips on the Doppler event record 92, the miss-distance can be determined with this increased accuracy in less than one minute.

While I have herein shown and described my invention in what I have conceived to be the most practical and preferred embodiment, it is recognized that departures may be made within the scope of the invention, which is not to be limited to the details disclosed herein, but is to be accorded the full scope of the claims so as to embrace any and all equivalent devices.

I claim as my invention:

1. A passive system for measuring the distance between a station and an object which are moving with respect to each other, comprising, at said station, a transmitter having a UHF carrier wave source modulated by the output of a sideband oscillator to provide two symmetrical UHF sidebands having a fixed frequency difference, the carrier being suppressed whereby said UHF sidebands are the transmitted signals, receiver circuit means for receiving said UHF sidebands after reflection from said object and also said UHF sidebands directly in attenuated form without reflection from said object and for detecting the two Doppler frequency components of the reflected signals, and phase sensitive circuit means coupled to the output of said receiver circuit means for generating an output signal which varies directly with variations in phase difference between said Doppler frequency components, said phase difference being directly proportional to the distance between said station and said object.

2. A passive system for measuring the distance between a station and an object which are moving with respect to each other, comprising, at said station, a transmitter having a UHF carrier wave source modulated by the output of a sideband oscillator to provide two symmetrical UHF sidebands having a fixed frequency difference, the carrier being suppressed whereby said UHF sidebands are the transmitted signals, receiver circuit means for receiving said UHF sidebands after reflection from said object and also said UHF sidebands directly in attenuated form without reflection from said object and for detecting the two Doppler frequency components of the reflected signals, and phase sensitive circuit means coupled to the output of said receiver circuit means for generating an output signal which varies in proportion to the phase difference between said Doppler frequency components, said phase sensitive circuit means including a bi-stable multivibrator which is triggered to one position of stability by the leading edge of each cycle of one Doppler frequency component and is triggered to the other position of stability by the leading edge of each cycle of the other Doppler frequency component, said multivibrator having a pulse output signal in which the duration of the individual pulse is directly proportional to the distance between said station and said object.

3. A system as defined in claim 2, which includes a telemetry transmitter at said station which is modulated by said multivibrator pulse ouput signal, whereby the output of said telemetry transmitter is a pulse duration modulated signal wherein the duration of the individual pulses is proportional to the distance between said station and said object.

4. A system as defined in claim 3, which includes a remote monitoring station comprising a telemetry receiver for receiving the pulse duration modulated signal transmitted by said telemetry transmitter and having a pulse output signal corresponding to the pulse output signal of said multivibrator, D.C. converter means coupled to the output of said telemetry receiver for establishing a fixed amplitude for the pulses, integrator means coupled to the output of said D.C. converter means for integrating the fixed amplitude pulses, and recording means for recording the amplitude of the D.C. signal from said integrator means as a function of time, said D.C. signal being directly proportional to the distance between said station and said object.

5. A system as defined in claim 3, which includes a remote monitoring station comprising a telemetry receiver for receiving the pulse duration modulated signal transmitted by said telemetry transmitter and having a pulse output signal corresponding to the pulse output signal of said multivibrator, and recording means coupled to the output of said telemetry receiver for recording the occurrence of said pulses as a function of time, each pulse corresponding to a fixed distance in space.

6. A system as defined in claim 3, which includes a remote monitoring station comprising a telemetry receiver for receiving the pulse duration modulated signal transmitted by said telemetry transmitter and having a pulse output signal corresponding to the pulse output signal of said multivibrator, a first recording means coupled to the output of said telemetry receiver for recording the occurrence of said pulses as a function of time, each pulse corresponding to a fixed distance in space, D.C. converter means connected to the output of said telemetry receiver for establishing a fixed amplitude for the pulses, integrator means coupled to the output of said D.C. converter means for integrating the fixed amplitude pulses, and a second recording means coupled to the output of said telemetry receiver for recording the amplitude of the D.C. signal from said integrator means as a function of time, said D.C. signal being directly proportional to the distance between said station and said object.

7. A system as defined in claim 6, wherein said first and second recording means comprise two channels of a direct writing oscillograph.

8. A system as defined in claim 2, which includes a camera at said station, electrical circuit means for actuating the camera shutter upon the receipt of a predetermined D.C. voltage level by said circuit means, and integrator means coupled to the output of said multivibrator to produce an average D.C. voltage which is a function of the distance between said station and said object, said D.C. voltage being fed to said circuit means for actuating the camera shutter when the station and object are a predetermined distance apart.

9. A system as defined in claim 8, wherein said circuit means has an electronic gate therein and amplitude detector means coupled with the output of said receiver circuit means and to said gate so as to open said gate when said amplitude detector means senses the presence of a Doppler frequency signal.

10. A passive system for measuring the distance between a station and an object which are moving with respect to each other, comprising, at said station, a transmitter including a UHF carrier wave source, a sideband oscillator and a first modulator, said carrier being modulated by the output of said sideband oscillator in said first modulator to provide two symmetrical UHF sidebands, the carrier being suppressed whereby said UHF sidebands are the transmitted signals; a local oscillator signal source including an offset oscillator having an IF frequency output signal, a second modulator and a filter, said UHF carrier being modulated by the output of said offset oscillator in said second modulator to provide a second pair of sidebands, the lower one of which is extracted in said filter and serves as a local oscillator signal at a frequency below said UHF carrier an amount equal to said offset oscillator IF output signal, said UHF sidebands and said local oscillator signal all being sidebands of said UHF carrier and thus all being coherent; a signal mixer; means for feeding said UHF sidebands into said mixer after reflection from said object and means for feeding said UHF sidebands in attenuated form directly into said mixer without reflection from said object, said local oscillator signal being heterodyned with said reflected and non-reflected UHF sidebands in said mixer to produce a pair of IF frequencies separated by the same frequency separation as said UHF sidebands, said two IF frequencies each having a Doppler frequency component; a pair of IF amplifiers coupled to the output of said signal mixer for amplifying each of said pair of IF frequencies, respectively; a pair of detectors coupled to the outputs of the respective IF amplifiers for detecting the Doppler frequency components of said pair of IF signals, and phase sensitive circuit means coupled to the outputs of said detectors for generating an output signal which varies directly with variations in the difference between said Doppler frequency components, said phase difference being directly proportional to the distance between said station and said object.

11. A passive system for measuring the distance between a station and an object which are moving with respect to each other, comprising, at said station, a transmitter including a UHF carrier wave source, a sideband oscillator and a first modulator, said carrier being modulated by the output of said sideband oscillator in said first modulator to provide two symmetrical UHF sidebands, the carrier being suppressed whereby said UHF sidebands are the transmitted signals; a local oscillator signal source including an offset oscillator having an IF frequency output, a second modulator and a filter, said UHF carrier being modulated by the output of said offset oscillator in said second modulator to provide a second pair of sidebands the lower one of which is extracted in said filter and serves as a local oscillator signal at a frequency below said UHF carrier an amount equal to said offset oscillator IF output signal, said UHF sidebands and said local oscillator signal all being sidebands of said UHF carrier and thus all being coherent; a signal mixer; means for feeding said UHF sidebands into said mixer after reflection from said object and the means for feeding said UHF sidebands in attenuated form directly into said mixer without reflection from said object, said local oscillator signal being heterodyned with said reflected and non-reflected UHF sidebands in said mixer to produce a pair of IF frequencies separated by the same frequency separation as said UHF sidebands, said two IF frequencies each having a Doppler frequency component; a pair of IF amplifiers coupled to the output of said signal mixer for amplifying each of said pair of IF frequencies, respectively; an injection mixer in which said local oscillator signal is heterodyned with said UHF sidebands from said first modulator to provide a pair of IF reference frequencies which correspond in frequency with said first mentioned pair of IF frequencies; a pair of detectors coupled to the outputs of the respective IF amplifiers and said injection mixer to beat said IF reference frequencies and said first mentioned IF frequencies in their respective detector to extract said Doppler frequency components of said pair of IF signals, and phase sensitive circuit means coupled to the output of said detectors for generating an output signal which varies in proportion to the difference between said Doppler frequency components, said phase difference being directly proportional to the difference between said station and said object.

12. A system as defined in claim 11, wherein said phase sensitive circuit means includes a bi-stable multivibrator which is triggered to one position of stability by the leading edge of each cycle of one Doppler frequency component, and is triggered to the other position of stability by the leading edge of each cycle of the other Doppler frequency component, said multivibrator having a pulse output signal in which the duration of the individual pulses is directly proportional to the distance between said station and said object.

13. A system as defined in claim 12, which includes a telemetry transmitter at said station which is modulated by said multivibrator pulse output signal, whereby the output of said telemetry transmitter is a pulse duration modulated signal wherein the duration of the individual pulses is proportional to the distance between said station and said object.

14. A system as defined in claim 13, which includes a remote monitoring station comprising a telemetry receiver for receiving the pulse duration modulated signal transmitted by said telemetry transmitter and having a pulse output signal corresponding to the pulse output signal of said multivibrator, D.C. converter means coupled to said telemetry receiver for establishing a fixed amplitude for the pulses, integrator means coupled to said D.C. converter means for integrating the fixed amplitude pulses, and recording means for recording the amplitude of the D.C. signal from said integrator means as a function of time, said D.C. signal being directly proportional to the distance between said station and said object.

15. A system as defined is claim 13, which includes a remote monitoring station comprising a telemetry receiver for receiving the pulse duration modulated signal transmitted by said telemetry transmitter and having a pulse output signal corresponding to the pulse output signal of said multivibrator, a first recording means coupled to said telemetry receiver for recording the occurrence of said pulses as a function of time, each pulse corresponding to a fixed distance in space, D.C. converter means coupled to said telemetry receiver for establishing a fixed amplitude for the pulses, integrator means coupled to said D.C. converter means for integrating the fixed amplitude pulses, and a second recording means for recording the amplitude of the D.C. signal from said integrator means as a function of time, said D.C. signal being directly proportional to the distance between said station and said object.

16. A system as defined in claim 15, wherein said first and second recording means comprise two channels of a direct writing oscillograph.

17. A system for measuring the distance between two relatively moving objects, comprising, at one of said objects, a transmitter having a UHF carrier wave source modulated by the output of a sideband oscillator to provide two symmetrical UHF sidebands having a fixed frequency difference, the carrier being suppressed whereby said UHF sidebands are the transmitted signals, receiver circuit means for receiving said UHF sidebands after reflection from the other of said objects and also said UHF sidebands directly in attenuated form without the reflection from said other object and for detecting the two Doppler frequency components of the reflected signals, and phase sensitive circuit means coupled to the output of said receiver circuit means for generating an output signal which varies directly with variations in phase difference between said Doppler frequency components, said phase difference being directly proportional to the distance between said objects.

18. A system for measuring the distance between two relatively moving objects, comprising, at one of said objects, means including a transmitter for producing and transmitting toward the other of said objects two signals having a fixed frequency difference, receiver circuit means for receiving said signals after reflection from said other object and also said signals directly without reflection from said other object and for detecting the two Doppler frequency components of the reflected signals, and phase sensitive circuit means coupled to the output of said receiver circuit means for generating an output signal which varies directly with variations in phase difference between said Doppler frequency components, said phase difference being directly proportional to the distance between said objects.

19. A system for measuring the distance between two relatively moving objects, comprising, at one of said objects, means including a transmitter for producing and transmitting toward the other of said objects two signals having a fixed frequency difference, receiver circuit means for receiving said signals after reflection from said other object and also said signals directly without reflection from said other object and for detecting the two Doppler frequency components of the reflected signals, and phase sensitive circuit means coupled to the output of said receiver circuit means for generating an output signal which varies in proportion to the phase difference between said Doppler frequency components, said phase sensitive circuit means including a bi-stable multivibrator which is triggered to one position of stability by the leading edge of each cycle of one Doppler frequency component and is triggered to the other position of stability by the leading edge of each cycle of the other Doppler frequency component, said multivibrator having a pulse output signal in which the duration of the individual pulses is directly proportional to the distance between said objects.

References Cited in the file of this patent

UNITED STATES PATENTS

| | | |
|---|---|---|
| 2,883,656 | Russell | Apr. 21, 1959 |
| 3,032,758 | Stavis | May 1, 1962 |